US006927959B2

(12) United States Patent
Herbst et al.

(10) Patent No.: US 6,927,959 B2
(45) Date of Patent: Aug. 9, 2005

(54) METHOD FOR OPERATING AN ELECTROMAGNETIC SWITCHING DEVICE AND ELECTROMAGNETIC SWITCHING DEVICE

(75) Inventors: Reinhard Herbst, Wernberg-Köblitz (DE); Norbert Mitlmeier, Ursensollen (DE)

(73) Assignee: Siemens Aktiengesellschaft, Munich (DE)

( * ) Notice: Subject to any disclaimer, the term of this patent is extended or adjusted under 35 U.S.C. 154(b) by 375 days.

(21) Appl. No.: 10/311,379

(22) PCT Filed: May 30, 2001

(86) PCT No.: PCT/DE01/02045

§ 371 (c)(1),
(2), (4) Date: Dec. 16, 2002

(87) PCT Pub. No.: WO01/97239

PCT Pub. Date: Dec. 20, 2001

(65) Prior Publication Data

US 2003/0174457 A1 Sep. 18, 2003

(30) Foreign Application Priority Data

Jun. 16, 2000 (DE) ........................................ 100 29 789

(51) Int. Cl.[7] ................................................ H02H 3/18
(52) U.S. Cl. ........................................................ 361/78
(58) Field of Search ........................................... 361/78

(56) References Cited

U.S. PATENT DOCUMENTS

| | | | | | |
|---|---|---|---|---|---|
| 4,672,501 | A | * | 6/1987 | Bilac et al. | 361/96 |
| 5,361,184 | A | | 11/1994 | El-Sharkawi et al. | 361/93 |
| 5,430,599 | A | | 7/1995 | Charpentier et al. | 361/152 |
| 5,440,180 | A | * | 8/1995 | DeVault et al. | 307/138 |
| 5,638,296 | A | * | 6/1997 | Johnson et al. | 700/286 |
| 5,684,668 | A | * | 11/1997 | Muramatsu et al. | 361/185 |
| 5,808,851 | A | * | 9/1998 | Birrell | 361/187 |
| 5,875,087 | A | * | 2/1999 | Spencer et al. | 361/87 |
| 5,963,021 | A | * | 10/1999 | Rostron et al. | 323/210 |
| 6,765,316 | B1 | * | 7/2004 | Elsner et al. | 307/130 |

FOREIGN PATENT DOCUMENTS

| | | | |
|---|---|---|---|
| DE | 41 05 698 | A1 | 8/1992 |
| DE | 198 08 299 | A1 | 9/1999 |
| EP | 0 575 792 | A1 | 12/1993 |

* cited by examiner

*Primary Examiner*—Brian Sircus
*Assistant Examiner*—James A. Demakis
(74) *Attorney, Agent, or Firm*—Harness, Dickey & Pierce P.L.C.

(57) ABSTRACT

Switching contacts of a switching device are provided to ensure optimum service life. An optimum switching point, in terms of the load of one of the switching contacts, is determined depending on a current path that is measured during the switching process and the switching point is shifted by a delay time from switching operation to switching operation. The optimal switching point is preferably determined by self-calibration of the switching device.

20 Claims, 1 Drawing Sheet

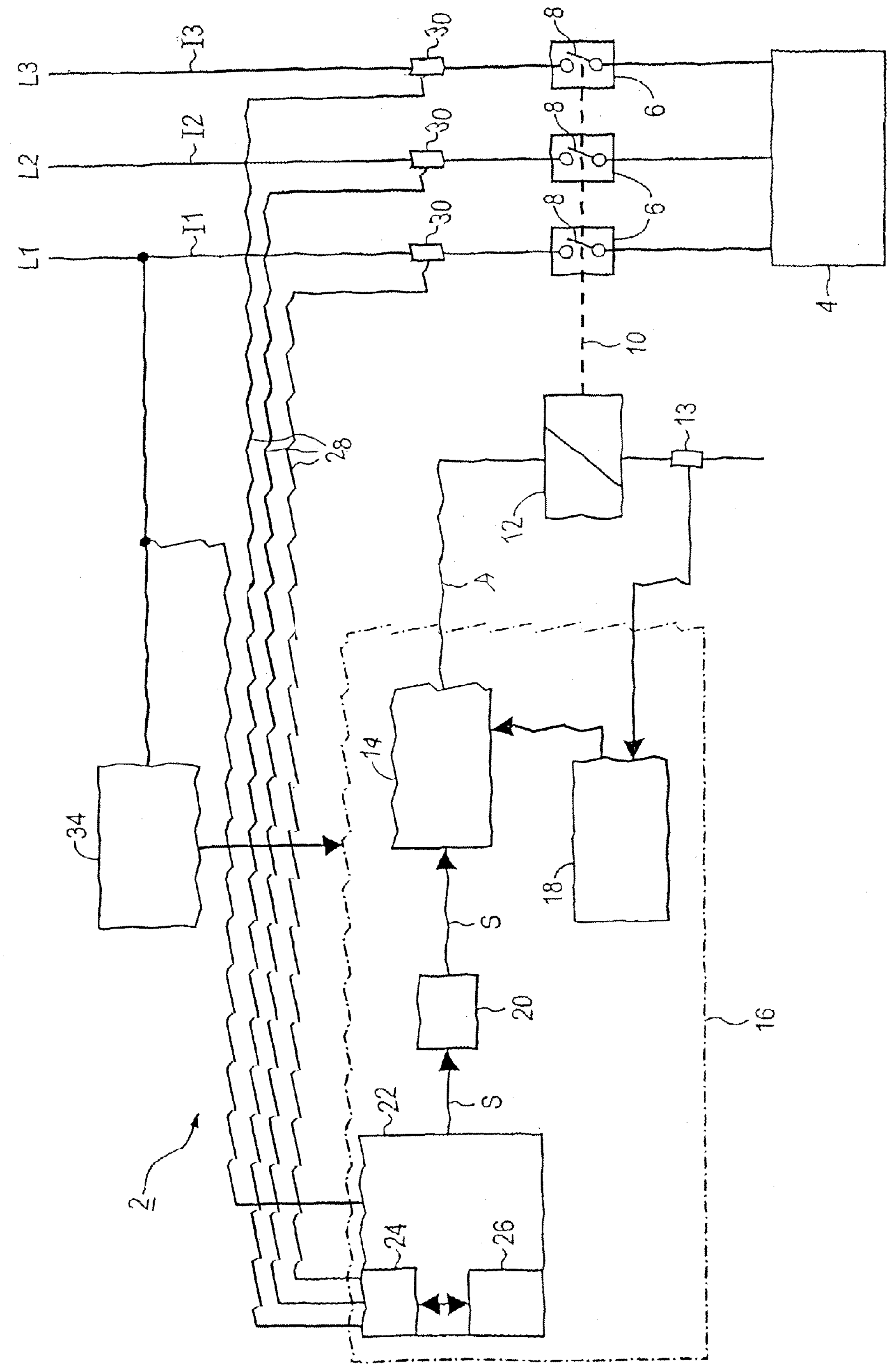
L3
L2
L1
I3
I2
I1
30
30
30
8
8
8
6
6
4
10
12
13
28
A
14
18
34
20
S
S
22
24
26
16
2

METHOD FOR OPERATING AN ELECTROMAGNETIC SWITCHING DEVICE AND ELECTROMAGNETIC SWITCHING DEVICE

This application is the national phase under 35 U.S.C. § 371 of PCT International Application No. PCT/DE01/02045 which has an International filing date of May 30, 2001, which designated the United States of America and which claims priority on German Patent Application No. DE 100 29 789.7 filed Jun. 16, 2000, the entire contents of which are hereby incorporated herein by reference.

FIELD OF THE INVENTION

The invention generally relates to a method for operating an electromagnetic switching device. In particular, the invention generally relates to a contactor for switching a three-phase load, in which a switching pulse is transmitted to a switching drive and switching units are operated after a constant switching time delay has passed, each of which switching units has a switching contact and is provided for one conductor of a conductor network, with the current profile in at least one of the conductors being measured, and an optimized switching time with regard to the load on one of the switching contacts being determined as a function of the measured current profile. The invention also generally relates to an electromagnetic switching device which is particularly suitable for carrying out such a method.

BACKGROUND OF THE INVENTION

An electromagnetically operating switching device, for example a contactor or a relay, whose switching contacts or main contacts switch the conductors in particular of a three-phase system, is in practice frequently subject to different wear levels on its switching contacts. This leads to failure of the switching device as soon as one of the three switching contacts which are provided in a three-phase system becomes unserviceable. This has represented a considerable restriction to the life of such switching devices, since the remaining switching contacts would often still be serviceable for some time.

This effect of different wear levels on the switching contacts, also referred to as the synchronization effect, results from the fact that the switching contacts which are subjected to wear during switching are switched at times which are not distributed in the same way statistically. One reason for this is, for example, that the switching drive via which the switching contacts are operated is driven in synchronism with the network. In this case, the switching contacts are operated at a fixed switching time with respect to that phase of the network which is used for the switching drive. Since the load on the switching contacts may be widely different at different phase angles, this leads to different wear levels of the individual switching contacts.

A method for operating an electromagnetic switching device is known from DE 41 05 698 C2. According to this document, the three phases of a three-phase network are switched during a switching operation at an advantageous time with regard to the respective phase angle of the individual currents. To do this, the method provides for the phase angle of the current to be measured in a reference phase, and for an optimized switching time to be derived from this by way of a processor. In order to achieve a uniform load on the three switching contacts, one switching drive is provided with a constant delay for switching on and off, so that the switching contacts close and open at an advantageous time. The different phase angle of the three phases is taken into account in that switching pieces of geometrically different designs are provided for operation of the switching contacts. By way of example, these have a different travel so that, during operation of the switching drive, the first phase is switched first of all, the second phase is switched after a specific delay, and the third phase is switched after a further specific delay.

Thus, according to DE 41 05 698 C2, the further phases arc switched with a delay, by way of mechanical elements, with respect to a reference phase on the basis of the determination of an optimized switching time, so that these mechanical elements also open and close at an advantageous time. However, the use of mechanical technology to set a delay time involves design complexity and its reliability is only limited.

U.S. Pat. No. 5,430,599 discloses a switching system which is intended in particular for use in high-power technology, and which takes account of temperature influences from the environment of a switching apparatus. In order to achieve a switching time which is as advantageous as possible with regard to the phase angle, a switching delay time is determined between a switching pulse and the actual opening and closing of a switching contact. The switching delay time may assume different values for the different phases in this field of high-power technology. In order to achieve a switching time which is as advantageous as possible, provision is made for each phase to be switched separately, on the basis of different switching delay times for the different phases. This has the disadvantage that an autonomous interrupter unit must be provided for each phase, and that an advantageous switching time must be determined for each phase.

SUMMARY OF THE INVENTION

An embodiment of the invention is based on an object of allowing uniform wear of the different switching contacts in a switching device, using simple technology.

According to an embodiment of the invention, an object is achieved by a method for operating an electromagnetic switching device, in particular a contactor for switching a three-phase load, in which a switching pulse is transmitted to a switching drive, once a constant switching delay time has passed, switching units are operated, which each have a switching contact and which are each provided for one conductor of the conductor network, the current profile in at least one of the conductors is measured, and an optimized switching time with respect to the load on one of the switching contacts is determined as a function of the measured current profile, and different switching times are chosen for different switching operations, in order to make the load on the respective switching contacts uniform.

The uniform wear or the uniform load on the different switching contacts over the life of the switching device is thus achieved in that in each case one phase is switched at an optimized time during each switching operation, and in that different phases are switched at an optimized time during different switching operations. One important precondition for this is the constant switching delay time, which allows the switching contacts to be switched in a defined manner at a desired time. Depending on which phase is intended to be switched in an optimized manner, a delay time which differs from one switching operation to the next is also added to the constant switching delay time.

This measure for alternating switching of the individual phases and optimized switching times allows uniform wear of all the switching contacts over the life of the switching device, using simple technology. There is no need for complex mechanical setting of different delay times for the different phases or for switching mechanisms which can be driven independently of one another for the individual phases.

In one embodiment of the invention, the switching device is automatically calibrated to the optimized switching time by varying the switching time during the first switching operations of the switching device, detecting the current profile associated with the respective switching time, and determining the optimum switching time from a comparison of the detected current profiles. In this case, both the phase angle of the current and the current level are preferably determined during the process of determining the current profile.

The automatic calibration means that there is no need for complex setting of an optimized switching time. In fact, the switching device itself identifies the best switching time. In this case, the specific characteristics of the load circuit which is switched by the switching device are taken into account automatically. There is therefore no need to explicitly know the parameters of the load circuit. In fact, the switching device uses the measured current profile itself to identify when an advantageous switching time occurs. It is thus irrelevant to the operation of the switching device whether the switching device is intended for switching a capacitive, inductive or resistive load. The automatic calibration is, in particular, also a major advantage when modifications are carried out on the load circuit. These are likewise recorded automatically.

The switching time is preferably shifted by a constant delay time from one switching operation to the next after the self-calibration process, this delay time corresponding in particular to a current phase difference of 120° in the conductors of a three-phase network. This makes it simple to ensure that the different conductors/phases are switched alternately at an advantageous time.

A control voltage which is provided from the conductor network or is synchronized to the conductor network is preferably provided for operation of the switching device, with the switching time being related to the phase angle of the control voltage. The control voltage thus offers a good reference capability for determining the switching time.

The current profile in each of the individual conductors is advantageously detected, in order to make it possible to determine an optimized switching time for each phase and, if appropriate, to set the delay time as appropriate.

According to one advantageous development, the switching drive is operated internally with direct current in order to ensure a constant switching delay time. In this case, it may he driven externally with a DC or AC voltage. In the case of switching drives which are operated internally with alternating current, one problem that generally arises is that the switching operation takes place only at specific phase angles of the control voltage. Even if the switching operations are distributed uniformly statistically over the phase angles of the control voltage for the switching drive this leads to a high probability of switching operations being carried out at specific phase angles. This synchronization means that it is generally impossible to use a constant switching delay for switching drives which are driven by alternating current, so that it is virtually impossible to achieve uniform wear of the switching contacts.

The alternating current in one phase of the conductor network which, in particular, also provides the control voltage for the switching device, or an alternating current which is synchronized to the conductor network, is preferably rectified in order to reduce the direct current for the switching drive.

Furthermore, in order to ensure a constant switching delay time, the switching drive is regulated, in particular electronically, in one preferred embodiment. The switching delay time is thus permanently monitored and set by a control loop. This ensures a suitable switching delay over the entire life, even when aging phenomena occur.

In this case, the coil current for a magnetic coil of the switching drive is preferably regulated at a constant value.

In further preferred alternatives, the speed of the switching process, that is to say the speed of the switching drive, or the magnetic flux in the coil can be regulated. With regard to the speed of the switching process, a low speed is advantageous in order to achieve a good bouncing response on operation of the switching contacts.

According to the invention, an object of the invention is also achieved by an electromagnetic switching device, in particular a contactor for switching a three-phase load, having a switching drive, which is connected to switching units which each comprise switching contact and are provided for in each case one of the conductors of a conductor network, a constant switching delay time between a switching pulse which is transmitted to the switching drive, and the operation of the switching units, that is to say the time at which the respective switching contacts close and open, at least one current measurement device for detection of the current profile in at least one of the conductors, and having a control unit for determining an optimized switching time as a function of the current profile and with regard to the load on one of the switching contacts, and having a delay module, by way of which the switching time can be shifted by a delay time between individual switching operations.

A switching device such as this is used in particular for carrying out the described method. The preferred embodiments and advantages described with regard to the method can be transferred in the same sense to the switching device. Particularly preferred embodiments of the switching device are specified in the dependent claims.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

One exemplary embodiment of the invention will be explained in more detail using the drawing. The single FIGURE of the drawing is a highly simplified block diagram of a switching device connected to a conductor network.

DETAILED DESCRIPTION OF THE PREFERRED EMBODIMENTS

According to the FIGURE, a switching device 2 is provided for switching the phase conductors L1 to L3 of a conductor network. In particular, the conductors L1 to L3 are part of a three-phase system and supply a load 4. The switching device 2 is in the form of an electromagnetic switching device and, in particular, is in the form of a contactor.

In order to switch the conductors L1 to L3, the switching device 2 has a switching unit 6, with a respective switching contact 8, for each of the phases. The switching contacts 8 are connected to a common switching drive 12 via a switching mechanism 10. The switching drive 12 is, in particular, in the form of a magnetic coil. The switching drive 12 has an associated measurement device 13 for a control variable.

The switching unit 12 is connected to a, power stage 14 of a control unit 16. The control unit 16 furthermore has a regulator 18, a delay module 20 and an evaluation unit 22, which is used for determining an advantageous switching time. The evaluation unit 22 has a memory 24 and a comparator 26, which arc connected to one another in order to interchange data. The evaluation unit 22 is in each case connected via data lines 28 to current measurement devices 30 which are associated with the respective conductors L1 to L3.

In the exemplary embodiment, a rectifier 34 taps off the alternating current from the conductor L1 of the conductor network, rectifies it and supplies the control unit 16 with direct current. The alternating current can alternatively also be tapped off from a voltage source which is synchronized to one of the phases L1 to L3 of the conductor network. The switching drive 12 is supplied with direct current from the control unit 16 via the power stage 14. The switching drive 12, which is operated by direct current, is useful for a constant switching delay time. In this case, the expression switching delay time means the time which passes from the transmission of a switching pulse A to the switching drive 12 until the closing or opening of the switching contacts 8.

The AC voltage on the conductor L1 is used as a control voltage U for the control unit 16. This is transmitted to the evaluation unit 22, in order to evaluate its phase angle and to use it as a reference phase angle.

During operation of the switching device 2, when a switching command occurs, that is to say not only when the load 4 is switched on but also when it is switched off, the evaluation unit 22 uses the control voltage U to determine a next switching time, which is the most suitable for switching of one of the switching units 6. By way of example, the evaluation unit 22 determines an optimized switching time for the conductor L1 from which the control voltage U is tapped off.

The process of determining the optimized switching time takes account of the switching delay time. After the determination process, the evaluation unit 22 passes a switching signal S to the delay module 20 where the switching signal S is, if necessary, delayed by a delay time before being transmitted to the power stage 14. A control current is passed from there as a switching pulse A to the switching drive 12. The switching drive 12 then operates the switching contacts 8 simultaneously, via the switching mechanism 10. The switching contacts 8 thus close and open at the same time.

The process of determining the optimized switching time in the evaluation unit 22 is based on finding the time with respect to the phase angle of the control voltage U at which the load on the switching contact 8 associated with the conductor L1 will be at its most favorable during the switching process. In this context, the expression favorable should be understood as meaning the minimum possible wear, so that a long life is achieved for the switching contact 8. One criterion for determining the favorable switching time is, for example, the current flowing through the conductor L1 when switching on. If the current flow is high when switching on, the loads on the switching contact 8 will be many times higher than when the currents are low.

In some circumstances, the phase relationship between the control voltage U and the current I1 flowing through the conductor L1 may be constant, depending on the nature of the load 4, that is to say whether load 4 is capacitive, conductive or resistive. If the phase angle of the control voltage U is known, it is thus in principle possible to deduce the appropriate phase angle of the current I1 and hence to determine the optimized switching time with respect to a favorable phase angle of the current I1. When the load is intended to be switched off, it is possible to detect the phase angle of the current I1 directly via the associated current measurement device 30, since, in this case, a current is flowing via the current measurement device. The current measurement devices 30 generally detect not only the phase angle of the current I1 to I3 but also the associated current levels.

The optimized switching time for the switching device 2 is determined automatically. A self-calibration process is carried out during the first switching operations. This is because the relationship between the phase angle of the control voltage and of the current I1 when switching on and off is generally not known exactly when switching for the first time or, at least, it would be complex to determine it.

Thus, for automatic calibration during the first switching operations, the evaluation unit 22 first of all emits a switching signal S at random switching times, and passes this without any delay as a switching pulse I to the switching drive 12. The current I1 to I3 flowing in the individual conductors L1 to L3 during switching is detected by the current measurement devices 30, and is transmitted to the memory 24. During the next switching operation, the switching signal S is emitted at a different time with respect to the phase angle of the control voltage U, and the currents I1 to I3 are once again stored in the memory 24. This is done over a number of switching operations, with the switching signal S in each case being emitted offset by a specific value with respect to the phase angle of the control voltage U in comparison to the previous, switching signals. The stored current data items are compared with one another in the comparator 26, and the best possible switching time with respect to the phase angle of the control voltage U is determined from the comparison. By way of example, the minimum of the current that occurs during a switching process is used as an indication of this for the switching-on process. Since only the measured current level with respect to the load on the switching contacts 8 is of interest, it is not absolutely essential to actually determine the phase relationship between the control voltage U and the current I1.

Since the criteria for favorable switching times are not the same for switching-on and switching-off processes, this self-calibration process is preferably carried out separately for the switching-on process and for the switching-off process. In addition, one of the three current phase angles may be used as a reference phase angle for calibration for the switching-off process.

The advantage of this self-calibration process is that the specific characteristics of the load 4 need not be known in order to determine the best possible switching time. Furthermore, this self-calibration can be carried out repeatedly and completely, without any major complexity, in order to check the optimized switching time. Aging phenomena or other effects such as changes on the load side 4 are thus recorded automatically.

As soon as the self-calibration process has been carried out, the control unit 16 is able to determine an optimized switching time when a switching command occurs. In order now to ensure that the three switching contacts 8 wear uniformly, the switching signal S is delayed by a specific time, by the delay module 20, from one switching operation to the next, so that one of the switching contacts 8 is in each case switched at an optimized switching time during different switching operations. The delay module 20 thus ensures that, on average, each of the switching contacts 8 is switched at a favorable switching time equally frequently. In the simplest case, the delay module builds in a delay time corresponding to a current phase shift of 120° for successive switching operations, assuming that the system is a three-phase system with a constant phase difference of 120° between the current phases of the individual conductors L1 to L3.

One major aspect of ensuring uniform wear of all three switching contacts 8 is to keep the switching delay time constant. One major factor is thus that the switching delay is kept constant. In the switching device 2, this is done firstly by ensuring that the switching drive 12 is operated with direct current. This is because, with switching drives which are operated with alternating current and are in the form of magnet coils, the switching delay time also varies severely as a function of the phase angle and the voltage value of the drive voltage for the switching drive 12.

A further measure for ensuring a constant switching delay time is also a control loop which, in addition to the regulator 18, has the power stage 14, the switching drive 12 and the measurement device 13 for the control variable. The measurement device 13 detects the control variable, for example the coil current, and transmits this to the regulator 18. The regulator 18 compares the measured coil current with a nominal value and, if there is any error from the nominal value, it passes an appropriate control pulse to the power stage 14 in order to vary the control current for the switching drive 12 such that the coil current measured via the measurement device 13 reaches the predetermined nominal value. As an alternative to the coil current, it is also possible, for example, to use parameters such as the magnetic flux or the switching speed of the switching contacts 8. The switching speed can be derived, for example, from the movement of the switching mechanism 10. In this case, a low switching speed of the switching contacts is advantageous in order to prevent excessive so-called bouncing when the switching contacts 8 close.

The functions of the regulator 18, of the delay module 20 and of the evaluation unit 22 are preferably integrated in a microprocessor.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for operating an electromagnetic switching device, comprising:

transmitting a switching pulse to a switching drive;

operating switching units, once a constant switching delay time has passed, which each have a switching contact and which are each provided for one conductor of the conductor network;

measuring the current profile in at least one of the conductors; and determining an optimized switching time with respect to the load on one of the switching contacts as a function of the measured current profile, choosing different switching times for different switching operations in order to ensure the load on the respective switching contacts uniform.

2. The method as claimed in claim 1, wherein the switching device is automatically calibrated to the optimized switching time by varying the switching time during the first switching operations, detecting the current profile associated with the respective switching time, and determining the optimum switching time from a comparison of the detected current profiles.

3. The method as claimed in claim 2, wherein, after the self-calibration process, the switching time is shifted by a constant delay from one switching operation to the next.

4. The method as claimed in claim 1, wherein a control voltage which is provided from the conductor network and is synchronized to the conductor network, is provided for operation of the switching device, and the optimized switching time is related to the phase angle of the control voltage.

5. The method as claimed in claim 1, wherein the current profile is detected in each of the conductors.

6. The method as claimed in claim 1, wherein the switching drive is operated with direct current in order to ensure a constant switching delay time.

7. The method as claimed in claim 6, wherein an alternating current in the conductor network or an alternating current which is synchronized to the conductor network is rectified in order to produce the direct current for the switching drive.

8. The method as claimed in claim 1, wherein the switching drive is regulated in order to ensure a constant switching delay time.

9. The method as claimed in claim 8, wherein the coil current of the switching drive, which is in the form of a magnet coil, is regulated at constant value.

10. An electromagnetic switching device, comprising:

a switching drive, which is connected to switching units which each include one switching contact and are provided for in each case one of the conductors of a conductor network;

a constant switching delay time between a switching pulse which is transmitted to the switching drive, and the operation of the switching units;

at least one current measurement device for detection of the current profile in at least one of the conductors; and a control unit for determining an optimized switching time as a function of the current profile and with regard to the load on one of the switching contacts, wherein the control unit includes a delay module, by way of which the switching time can be shifted by a delay time between individual switching operations.

11. The switching device as claimed in claim 10, wherein, for automatic determination of an optimized switching time, the control unit has a memory for the determined current profiles as well as a comparator for comparison of the determined current profiles.

12. The switching device as claimed in claim 10, wherein the delay time is constant.

13. The switching device as claimed in claim 10, wherein the switching drive is designed internally for direct current.

14. The switching device as claimed in claim 10, wherein a control loop is provided for controlling the switching drive and for ensuring the constant switching delay time.

15. The method as claimed in claim 2, wherein a control voltage which is provided from the conductor network and is synchronized to the conductor network, is provided for operation of the switching device, and the optimized switching time is related to the phase angle of the control voltage.

16. The method as claimed in claim 3, wherein a control voltage which is provided from the conductor network and is synchronized to the conductor network, is provided for operation of the switching device, and the optimized switching time is related to the phase angle of the control voltage.

17. The switching device as claimed in claim 11, wherein the delay time is constant.

18. The switching device as claimed in claim 11, wherein the switching drive is designed internally for direct current.

19. The switching device as claimed in claim 12, wherein the switching drive is designed internally for direct current.

20. The switching device as claimed in claim 11, wherein a control loop is provided for controlling the switching drive and for ensuring the constant switching delay time.

* * * * *